(12) United States Patent
Chen (10) Patent No.: US 10,311,807 B2
(45) Date of Patent: Jun. 4, 2019

(54) GAMMA CORRECTION SYSTEM AND METHOD

(71) Applicant: Shenzhen China Star Optoelectronics Technology Co., Ltd., Shenzhen, Guangdong (CN)

(72) Inventor: Xinhong Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 306 days.

(21) Appl. No.: 15/301,022

(22) PCT Filed: Jul. 14, 2016

(86) PCT No.: PCT/CN2016/090074
§ 371 (c)(1),
(2) Date: Sep. 30, 2016

(87) PCT Pub. No.: WO2017/210960
PCT Pub. Date: Dec. 14, 2017

(65) Prior Publication Data
US 2018/0204529 A1  Jul. 19, 2018

(30) Foreign Application Priority Data
Jun. 8, 2016 (CN) .............................. 2016 1 040199

(51) Int. Cl.
*G09G 3/36* (2006.01)
*H04N 5/202* (2006.01)
*G09G 3/00* (2006.01)

(52) U.S. Cl.
CPC ............... *G09G 3/36* (2013.01); *G09G 3/006* (2013.01); *G09G 2320/0233* (2013.01);
(Continued)

(58) Field of Classification Search
CPC ... G09G 3/36; G09G 2320/0233; H04N 5/202
See application file for complete search history.

(56) References Cited

U.S. PATENT DOCUMENTS

| | | | | |
|---|---|---|---|---|
| 2008/0180375 A1* | 7/2008 | Wang | .................. | G09G 3/3611 345/89 |
| 2009/0002285 A1* | 1/2009 | Baba | .................. | G09G 3/3406 345/77 |

(Continued)

FOREIGN PATENT DOCUMENTS

| | | |
|---|---|---|
| CN | 103021365 A | 4/2013 |
| CN | 103310752 A | 9/2013 |

(Continued)

*Primary Examiner* — Antonio Xavier
(74) *Attorney, Agent, or Firm* — Andrew C. Cheng (57) ABSTRACT

The present disclosure provides a gamma correction system and method. In the present disclosure, a gamma correction method used for a display panel of a liquid crystal display includes: measuring actual brightness values of preset highest grayscale and lowest grayscale of a central region of the display panel; calculating target brightness values of respective preset tie-point grayscales of the central area based on the actual brightness values, wherein the respective preset tie-point grayscale are located between the preset highest grayscale and the lowest grayscale; adjusting the respective preset tie-point grayscale of the central region and regions of both sides respectively according to the target brightness values, and computing compensating grayscale values of the adjusted respective preset tie-point grayscale; storing the compensating grayscale values, and correcting the gamma curves of the central region and the regions of both sides by using the stored compensating grayscale values.

4 Claims, 9 Drawing Sheets

(52) U.S. Cl.
CPC ............... *G09G 2320/0276* (2013.01); *G09G 2320/0285* (2013.01); *G09G 2320/0693* (2013.01); *H04N 5/202* (2013.01)

(56) References Cited

U.S. PATENT DOCUMENTS

| | | | | |
|---|---|---|---|---|
| 2011/0316893 A1* | 12/2011 | Lee | ...................... | G09G 3/3208 345/690 |
| 2012/0050498 A1* | 3/2012 | Jung | ...................... | G09G 3/003 348/51 |
| 2012/0147138 A1* | 6/2012 | Yu | ........................ | G02B 27/26 348/43 |
| 2014/0160174 A1* | 6/2014 | Tsuei | .................. | G09G 3/2003 345/690 |
| 2015/0070410 A1* | 3/2015 | Huang | ................ | G09G 3/3607 345/691 |
| 2015/0091949 A1* | 4/2015 | Kim | ...................... | G09G 3/3648 345/690 |
| 2015/0145894 A1* | 5/2015 | Kim | ...................... | G09G 3/3607 345/690 |
| 2016/0125781 A1* | 5/2016 | Yang | .................... | G09G 3/2003 345/694 |
| 2016/0196786 A1* | 7/2016 | Kim | ........................ | G09G 3/20 345/697 |
| 2016/0196793 A1* | 7/2016 | Xu | ........................ | G09G 3/3611 345/694 |
| 2016/0342040 A1* | 11/2016 | Lee | .................... | G02F 1/133707 |
| 2017/0289517 A1* | 10/2017 | Wan | .................... | H04N 13/189 |

FOREIGN PATENT DOCUMENTS

| | | |
|---|---|---|
| CN | 103325357 A | 9/2013 |
| CN | 103474042 A | 12/2013 |
| CN | 103943088 A | 7/2014 |
| CN | 103985333 A | 8/2014 |
| CN | 105096875 A | 11/2015 |
| CN | 105259687 A | 1/2016 |
| CN | 105390087 A | 3/2016 |
| CN | 105427788 A | 3/2016 |
| JP | 2002366122 A | 12/2002 |

\* cited by examiner (Prior Art)

| STANDARD GRAYSCALE | CENTRAL POINT (nits) | SIDE | GRAYSCALE DATA |
|---|---|---|---|
| 0 | 0.05 | 0.048 | 1 |
| 16 | 0.7 | 0.71 | 15 |
| 31 | 3.3 | 3.28 | 28 |
| 127 | 76.2 | 76 | 122 |
| 223 | 260.5 | 260 | 220 |
| 254 | 344 | 343.6 | 252 |
| 255 | 344.7 | 344.6 | 254 |

GAMMA CORRECTION SYSTEM AND METHOD

TECHNICAL FIELD

The present application relates to the field of liquid crystal display, and more particularly, to a gamma correction system and method used for a display panel of a liquid crystal display.

BACKGROUND ART

Figure 1:
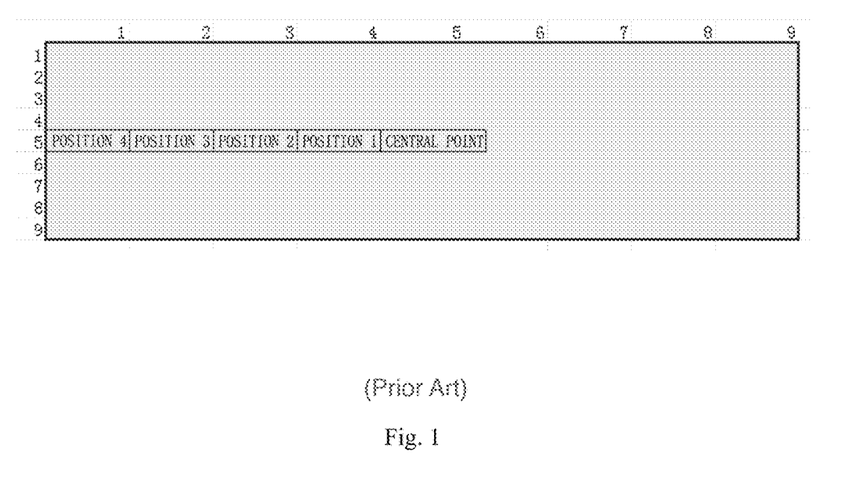
FIG. 1 is a view of a plurality of positions on a display panel of a liquid crystal display.
Figure 2:
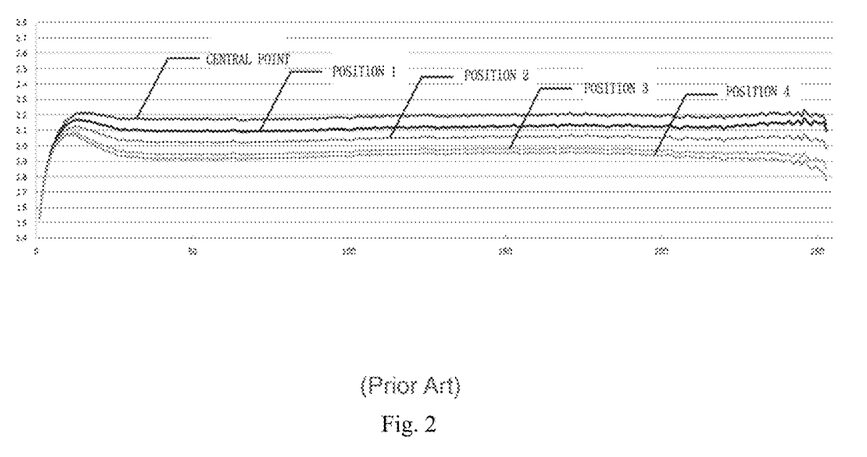
FIG. 2 is gamma curve graph of a plurality of positions adjusted by using the existing curve adjustment method.

Currently, the existing liquid crystal display only has one group of gamma voltages, and generally, an optics engineer may only adjust a gamma curve with respect to a central point of the display panel, causing an optimal display effect (gamma value: 2.2) at a central region of the panel, while a relatively bad display effect at both sides of the panel. For example, a module of a sheet of display panel is measured, and the gamma curves of the central point and other four positions (as shown in FIG. 1) are taken as examples. As shown in FIG. 2, the gamma curve of the central point has been adjusted to be optimum, and the gamma curves of the other four positions can be obtained through measurement. The following conclusion can be reached: the further the measuring position is away from the central point, the more the gamma curve will deviates from 2.2.

A Chinese patent application numbered 201510387860.X discloses a gamma adjustment method of liquid crystal display panel, the method including the following steps: dividing a display region of the liquid crystal display panel to obtain n sub display regions; dividing a full gray-scale image into n groups to obtain n gray-scale image groups; making the n sub display regions display a first selected gray-scale image in a corresponding gray-scale image group simultaneously; utilizing photoelectric sensors arranged on the sub display regions (normally the central region) to detect the brightness of the first selected gray-scale image; obtaining the gamma curve of the liquid crystal display panel according to the gray scale of the first selected gray-scale image and the brightness of the first selected gray-scale image; and adjusting the gamma curve of the liquid crystal display panel according to a preset gamma curve. However, the above method cannot adjust the gamma curve with respect to the different regions of the display panel.

In the prior art, the generally used gamma adjustment method is used to adjust a gamma voltage only with respect to the central point of the display panel. FIG. 1 is a view of a plurality of positions on the liquid crystal display. FIG. 2 is a gamma curve graph adjusted by using the above curve adjustment method with respect to the plurality of positions in FIG. 1.

As shown in FIG. 1, the central point is located at a central position of the display panel, positions 1, 2, 3 and 4 deviate from the central point in sequence, and the display effect of the entire display panel is adjusted by adjusting the gamma curve with respect to the central point. Normally, a standard gamma value of the liquid crystal display is 2.2, and an optimal display effect can be achieved under such value. In this embodiment, the gamma value of the central point is made to be equal to or close to 2.2 through adjusting the gamma voltage. As shown in FIG. 2, the further the position is away from the central point, the more the measured gamma curve will deviates from 2.2, that is, the more the position deviates from the central region, the worse the display effect thereof will be. Thus it can be seen that, the display effect of the entire display panel can be hardly guaranteed by only adjusting the gamma voltage of the central point, and especially with respect to different regions, as the position deviates from the central point, the display effect thereof will also deteriorate.

Thus in terms of adjusting the display effects of different regions of the display panel, the existing gamma adjustment method has many defects. Thus it has become a major problems in the prior art how to adjust the gamma curve of the display panel more effectively and perform gamma adjustment with respect to different regions so as to improve the display effect.

SUMMARY

In order to overcome the defects of the prior art, the present disclosure provides a gamma correction system and method.

In accordance with an exemplary embodiment of the present disclosure, provided is a gamma correction method used for a display panel of a liquid crystal display, the method including: measuring actual brightness values of preset highest grayscale and lowest grayscale of a central region of the display panel; computing target brightness values of respective preset tie-point grayscale of the central region based on the actual brightness values of the preset highest grayscale and lowest grayscale of the central region, wherein the respective preset tie-point grayscale are located between the preset highest grayscale and the lowest grayscale; adjusting the respective preset tie-point grayscale of the central region and regions of both sides respectively according to the target brightness values of the respective preset tie-point grayscale of the central region, and computing compensating grayscale values of the adjusted respective preset tie-point grayscale of the central region and the regions of both sides; storing the compensating grayscale values of the central region and the regions of both sides, and correcting the gamma curves of the central region and the regions of both sides by using the stored compensating grayscale values of the central region and the regions of both sides.

Alternately, measuring the actual brightness values of the preset highest grayscale and lowest grayscale of the central region of the display panel includes: allowing the display panel to display images of the preset highest grayscale and lowest grayscale; measuring and recording respectively the actual brightness values of the preset highest grayscale and lowest grayscale of the central region of the display panel.

Alternately, adjusting the respective preset tie-point grayscale of the central region and regions of both sides according to the target brightness values of the central region and computing the adjusted compensating grayscale values of the central region and the regions of both sides includes: allowing the display panel to display images of the respective preset tie-point grayscale, and measuring the actual brightness values of the respective preset tie-point grayscale of the central region of the display panel; adjusting the respective preset tie-point grayscale of the central region according to the target brightness values of the respective preset tie-point grayscale of the central region, so that the actual brightness values of the respective preset tie-point grayscale are respectively equal to the target brightness values of the respective preset tie-point grayscale; computing the compensating grayscale values of the adjusted respective preset tie-point grayscale of the central region.

Alternately, adjusting the respective preset tie-point grayscale of the central region and regions of both sides based on the target brightness values of the central region and computing the adjusted compensating grayscale values of the central region and the regions of both sides further includes: measuring the actual brightness values of the respective preset tie-point grayscale of the regions of both sides of the display panel; adjusting the corresponding respective preset tie-point grayscale of the regions of both sides according to the brightness values of the adjusted respective preset tie-point grayscale of the central region, so that the actual brightness values of the respective preset tie-point grayscale of the regions of both sides are respectively equal to the target brightness values of the respective preset tie-point grayscale of the central region; computing the compensating grayscale values of the adjusted respective preset tie-point grayscale of the regions of both sides.

Alternately, the respective preset tie-point grayscale of the central region and the regions of both sides are adjusted by adjusting the gamma voltage.

Alternately, the preset highest grayscale and lowest grayscale are 255 grayscale and 0 grayscale respectively.

Alternately, the method can further include: computing the target brightness values of respective preset tie-point grayscale of the central region according to a grayscale brightness formula, wherein the grayscale brightness formula is as follows:

$$Tn = \frac{n^{2.2}}{255^{2.2}}(L255 - L0) + L0$$

(wherein n is a value of the grayscale, and Tn is the target brightness value corresponding to the grayscale value, L255 is the actual brightness value of the 255 grayscale, and L0 is the actual brightness value of the 0 grayscale).

Alternately, the respective preset tie-point grayscale are 16 grayscale, 31 grayscale, 127 grayscale and 223 grayscale respectively.

Alternately, the method further includes: receiving original image data, distinguishing an image display region, searching the compensating grayscale value corresponding to the image display region in the stored compensating grayscale values of the respective regions, correcting the gamma curves of the respective regions accordingly by using the searched compensating grayscale values, and transmitting the corrected image data to the display panel.

In accordance with an exemplary embodiment of the present disclosure, provided is a gamma correction system used for a display panel of a liquid crystal display, including a gamma adjusting module and a control module. The gamma adjusting module includes a primary sensor module, secondary sensor modules and a computation module. The primary sensor module is installed on a central region of the display panel and is used for measuring actual brightness values of a plurality of grayscale of the central region of the display panel. The secondary sensor modules are installed on regions of both sides of the display panel and are used for measuring the actual brightness values of a plurality of grayscale of the regions of both sides of the display panel. The computation module is configured to: allow the display panel to display images of the preset highest grayscale and lowest grayscale, and to receive the actual brightness values of the preset highest grayscale and lowest grayscale of the central region of the display panel from the primary sensor module; computing target brightness values of respective preset tie-point grayscale of the central region based on the actual brightness values of the preset highest grayscale and lowest grayscale of the central region, and the respective preset tie-point grayscale are located between the preset highest grayscale and the lowest grayscale; allow the display panel to display images of the respective preset tie-point grayscale; receive the actual brightness values of the respective preset tie-point grayscale of the central region from the primary sensor module, and compute compensating grayscale values of the respective preset tie-point grayscale of the central region adjusted through the control module; receive the actual brightness values of the respective preset tie-point grayscale of the regions of both sides from the secondary sensor modules, and compute the compensating grayscale values of the respective preset tie-point grayscale of the regions of both sides adjusted through the control module. The control module is configured to: adjust the respective preset tie-point grayscale of the central region and regions of both sides based on the computed target brightness values of the respective preset tie-point grayscale of the central region, so that the actual brightness values of the respective preset tie-point grayscale of the central region and the regions of both sides are respectively equal to the target brightness values of the respective preset tie-point grayscale of the central region; receive the compensating grayscale values of the central region and the regions of both sides from the computation module for storage, and correct the gamma curves of the central region and the regions of both sides by using the stored compensating grayscale values of the central region and the regions of both sides.

Alternately, the control module is further configured to: adjust the respective preset tie-point grayscale of the central region according to the computed target brightness values of the respective preset tie-point grayscale of the central region, so that the actual brightness values of the respective preset tie-point grayscale of the central region are respectively equal to the target brightness values of the respective preset tie-point grayscale.

Alternately, the control module is further configured to: adjusting the corresponding respective preset tie-point grayscale of the regions of both sides based on the brightness values of the adjusted respective preset tie-point grayscale of the central region, so that the actual brightness values of the respective preset tie-point grayscale of the regions of both sides are respectively equal to the target brightness values of the respective preset tie-point grayscale of the central region.

Alternately, the control module adjusts the respective preset tie-point grayscale of the central region and the regions of both sides by adjusting the gamma voltage.

Alternately, the preset highest grayscale and lowest grayscale are 255 grayscale and 0 grayscale respectively.

Alternately, the computation module is further configured to: computing the target brightness values of respective preset tie-point grayscale of the central region based on a grayscale brightness formula, wherein the grayscale brightness formula is as follows:

$$Tn = \frac{n^{2.2}}{255^{2.2}}(L255 - L0) + L0$$

(wherein n is a value of the grayscale, and Tn is the target brightness value corresponding to the grayscale value, L255 is the actual brightness value of the 255 grayscale, and L0 is the actual brightness value of the 0 grayscale).

Alternately, the respective preset tie-point grayscale are 16 grayscale, 31 grayscale, 127 grayscale and 223 grayscale respectively.

Alternately, the control module may be further configured to: receive the original image data, distinguishing an image display region, searching the compensating grayscale value corresponding to the image display region in the stored compensating grayscale values of the respective regions, correcting the gamma curves of the respective regions accordingly by using the searched compensating grayscale values, and transmit the corrected image data to the display panel.

Other aspects and/or advantages of the present disclosure will be partially illustrated in the following description, and the rests will be apparent through the description or may be learned by implementation of the present disclosure.

BRIEF DESCRIPTION OF THE DRAWINGS

These and/or other aspects and advantages of the disclosure will become apparent and more readily appreciated from the following description of the embodiments, taken in conjunction with the accompanying drawings in which.

DETAILED DESCRIPTION OF EXEMPLARY EMBODIMENTS

Example embodiments will now be described in detail hereinafter with reference to the accompanying drawings. The major parts related to the inventive concept are clearly and concisely illustrated in the drawings, the shape of layer or region may be exaggerated, and the minor parts may be omitted to avoid unclearness of expression. In the drawings, the same reference sign is always used to indicate the same part. However, the present disclosure is not limited to the following embodiments. The features, parts or structures involved in the respective embodiments or corresponding to method descriptions may all be applied to other embodiments independently or in combination.

The present disclosure provides a regional gamma correction solution for adjusting a gamma curve with respect to different regions of a display panel. The present disclosure takes an application of thin film transistor liquid crystal display (TFT-LCD) as an example for detailed illustration.

Figure 3:
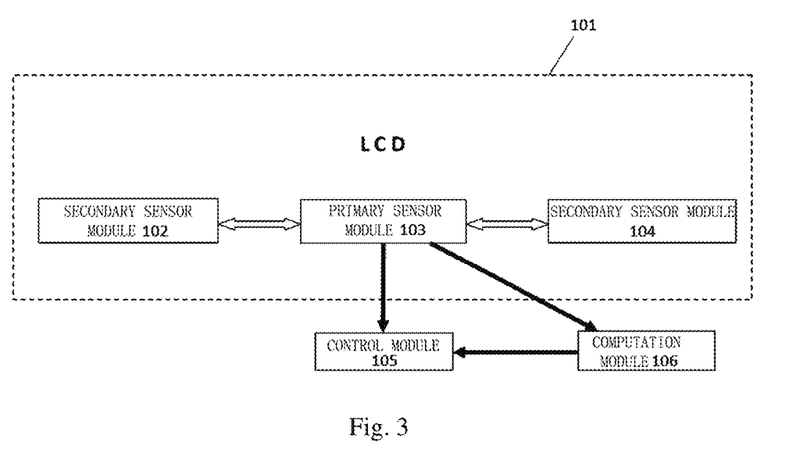
FIG. 3 is a view of an architecture of a gamma correction system used for the display panel of the liquid crystal display according to an embodiment of the present disclosure.

FIG. 3 is a view of an architecture of a gamma correction system used for a display panel according to an embodiment of the present disclosure. The system is a gamma correction system used for a display panel 101 of a liquid crystal display (LCD), the system includes a gamma adjusting module, and the gamma adjusting module includes: a primary sensor module 103, a secondary sensor modules 102 and 104 and a computation module 106. The system further includes a control module 105. The computation module 106 may be a hardware device such as a computer or a processor, or may be a firmware or an application program which may be realized through software codes. The control module 105 may be realized through a hardware device such as a hardware circuit board, or may be realized through software codes.

The primary sensor module 103 is installed on a central region of the display panel 101 of the LCD, and is used for measuring actual brightness values of a plurality of grayscale of the central region of the display panel 101. The secondary sensor modules 102 and 104 are installed on regions of both sides of the display panel and are used for measuring the actual brightness values of a plurality of grayscale of the regions of both sides of the display panel 101 respectively. The primary sensor module 103 is connected and communicates with the secondary sensor modules 102 and 104 each other. The primary sensor module 103 is connected to the computation module 106 through a universal serial bus (USB) or a universal asynchronous receiver transmitter (UART) in order to perform communication with the computation module 106. The primary sensor module 103 is connected to the control module 105 through an I2C bus or a serial peripheral interface (SPI) in order to perform communication with the control module 105. In addition, the computation module 106 may also perform communication with the control module 105 through wired and/or wireless connection means.

The computation module 106 allows the display panel 101 to display images of a preset highest grayscale and lowest grayscale, wherein the preset highest grayscale may be 255 grayscale, and the preset lowest grayscale may be 0 grayscale. Alternately, the preset highest grayscale and lowest grayscale may be other grayscale values. Accordingly, the primary sensor module 103 measures the actual brightness values of the preset highest grayscale and lowest grayscale of the central region of the display panel 101, and transmits the measured brightness value to the computation module 106.

The computation module 106 receives the actual brightness values of the preset highest grayscale and lowest grayscale of the central region of the display panel 101 from the primary sensor module 103. Then, the computation module 106 computes target brightness values of respective preset tie-point grayscale of the central region based on the actual brightness values of the preset highest grayscale and lowest grayscale of the central region. Wherein the respective preset tie-point grayscale are located between the preset highest grayscale and the lowest grayscale, for example, the respective preset tie-point grayscale may be 16 grayscale, 31 grayscale, 127 grayscale, 223 grayscale and so on.

Then, the computation module 106 allows the display panel 101 to display images of the respective preset tie-point grayscale, the primary sensor module 103 measures the actual brightness values of the respective preset tie-point grayscale of the central region of the display panel 101 and transmits the measured brightness value to the computation module 106. The computation module 106 receives the actual brightness values of the respective preset tie-point grayscale of the central region from the primary sensor module 103. The control module 105 adjusts the respective preset tie-point grayscale of the central region according to the computed target brightness values of the respective preset tie-point grayscale of the central region, so that the actual brightness values of the respective preset tie-point grayscale are respectively equal to the target brightness values of the respective preset tie-point grayscale. The primary sensor module 103 measures the actual brightness values of the adjusted respective preset tie-point grayscale of the central region and transmits the measured brightness value to the computation module 106. The computation module 106 computes compensating grayscale values of the adjusted respective preset tie-point grayscale of the central region.

In addition, the secondary sensor modules 102 and 104 measure actual brightness values of the respective preset tie-point grayscale of regions of both sides of the display panel 101 and transmits the measured brightness values to the computation module 106. The computation module 106 receives the actual brightness values of the respective preset tie-point grayscale of the regions of both sides from the secondary sensor modules 102 and 104. The control module 105 adjusts the corresponding respective preset tie-point grayscale of the regions of both sides according to the brightness values of the adjusted respective preset tie-point grayscale of the central region, so that the actual brightness values of the respective preset tie-point grayscale of the regions of both sides are respectively equal to the target brightness values of the respective preset tie-point grayscale of the central region. The secondary sensor modules 102 and 104 measure actual brightness values of the adjusted respective preset tie-point grayscale of regions of both sides and transmits the measured brightness values to the computation module 106. The computation module 106 computes the compensating grayscale values of the adjusted respective preset tie-point grayscale of the regions of both sides.

Then, the control module 105 receive the compensating grayscale values of the central region and the regions of both sides from the computation module 106 and stores the received compensating grayscale values in a memory; the control module 105 may correct the gamma curves of the central region and the regions of both sides by using the stored compensating grayscale values of the central region and the regions of both sides.

Figure 4:
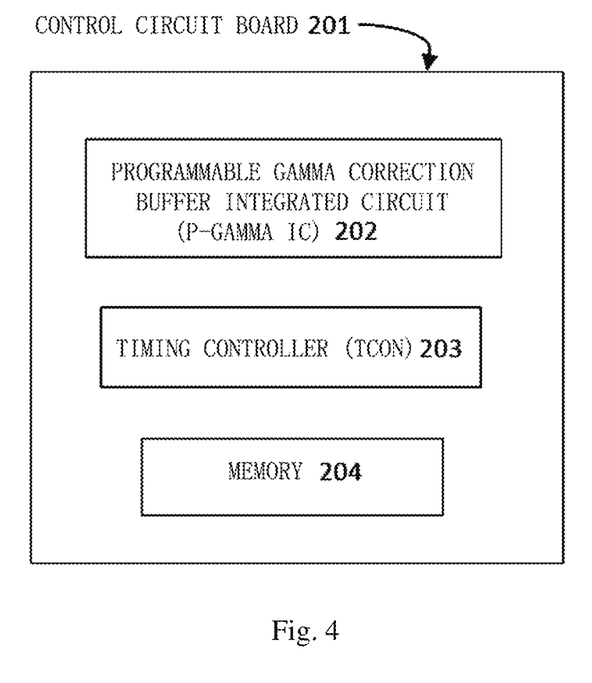
FIG. 4 is a view of a structure of a control module according to an embodiment of the present disclosure.

FIG. 4 is a view of a structure of a control module for gamma correction according to an embodiment of the present disclosure. For example, the control module may be a control circuit board 201 having a controlling function. The control circuit board 201 includes a programmable gamma correction buffer integrated circuit (P-gamma IC) 202, a timing controller (TCON) 203 and a memory 204. The P-gamma IC 202 can generate a gamma reference voltage according to a gamma correction operation. The memory 204 is used for storing the received compensating grayscale values of different regions of the display panel, and the memory 204 may be various types of electronic storage device, such as a flash memory, an electrically erasable programmable read-only memory (EEPROM) and so on. The timing controller 203 can read compensating data in the memory 204 and correct the gamma curves of the respective region of the display panel based on the compensating data.

Figure 5:
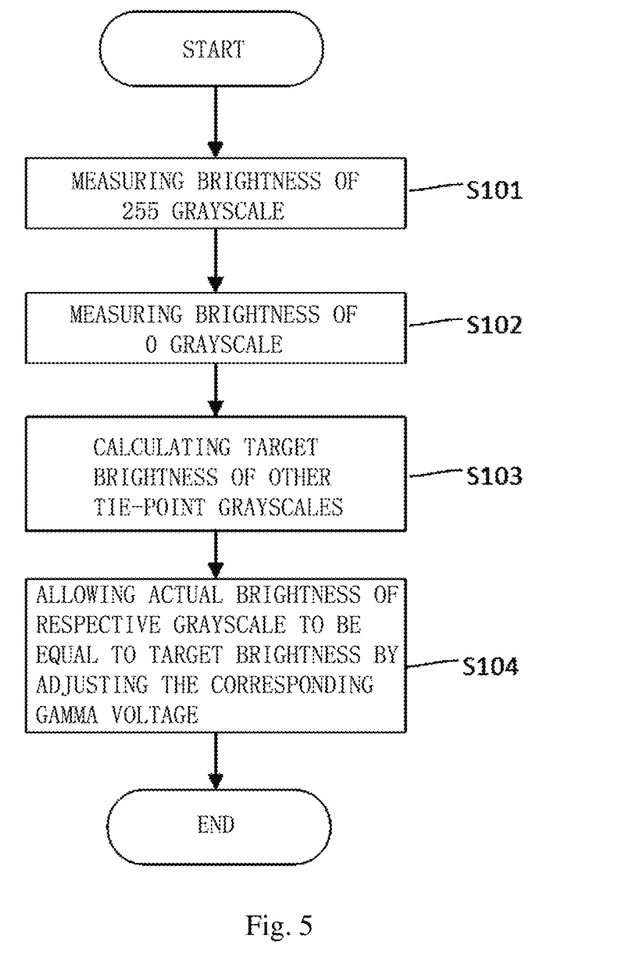
FIG. 5 is an operation flowchart with respect to the central region of the display panel of the liquid crystal display according to an embodiment of the present disclosure.

FIG. 5 is an operation flowchart with respect to the central region of the display panel 101 according to an embodiment of the present disclosure.

In step S101, the display panel 101 is allowed to display images of 255 grayscale by the computation module 106, a current brightness value of the central region of the display panel 101 is measure by the primary sensor module 103 and the measured value is recorded as L255. In step S102, the display panel is allowed to display images of 0 grayscale by the computation module 106, a current brightness value of the central region of the display panel 101 is measured by the primary sensor module 103 and the measured value is recorded as L0. In step S103, the computation module 106 computes the target brightness values of the respective preset tie-point grayscale (for example, 16 grayscale, 31 grayscale, 127 grayscale, 223 grayscale and so on) according to the computation formula (1), and records the calculated target brightness values respectively as Tn, such as T16, T31, T127, T223 and so on.

$$Tn = \frac{n^{2.2}}{255^{2.2}}(L255 - L0) + L0 \qquad (1)$$

($n$ being a natural member such as 16, 31, 127, 223 and so on)

Wherein n is a value of the grayscale, Tn is the target brightness value corresponding to the grayscale value, L255 is the actual brightness value of the 255 grayscale, and L0 is the actual brightness value of the 0 grayscale.

In step S104, the display panel 101 is allowed to display images of grayscale that need to be adjusted (that is, the respective preset tie-point grayscale, such as 16 grayscale, 31 grayscale, 127 grayscale, 223 grayscale and so on) by the computation module 106; a current brightness value of the central region of the display panel 101 is measured by the primary sensor module 103 and the measured value is recorded as Ln. The gamma voltage is adjusted through the control module 105 so that the Ln of the central region of the display panel is equal to Tn. Then, an operation with respect to the central region of the display panel 101 is over.

Figure 6:
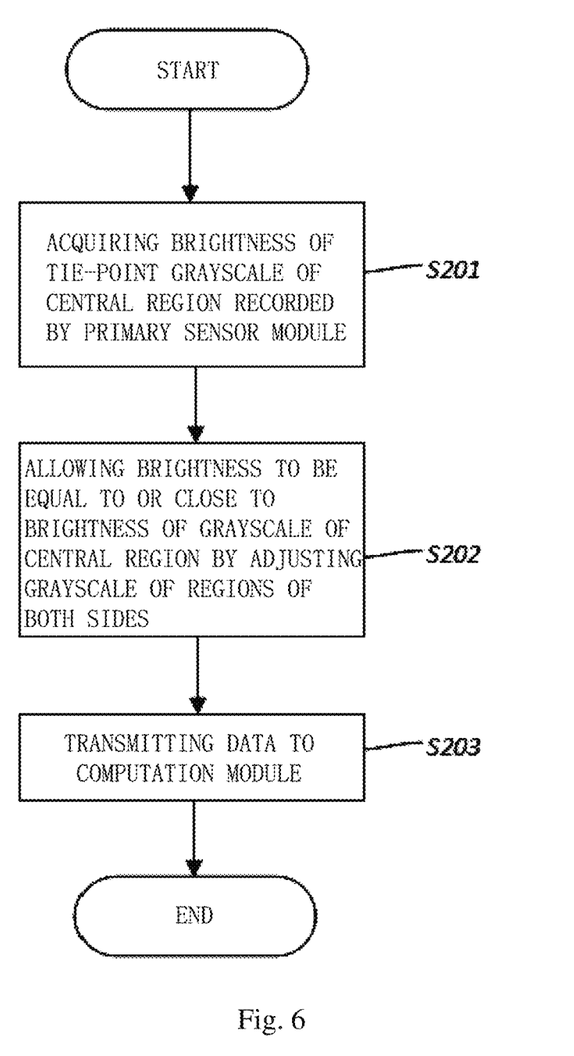
FIG. 6 is an operation flowchart with respect to the regions of both sides of the display panel of the liquid crystal display according to an embodiment of the present disclosure.

FIG. 6 is an operation flowchart with respect to regions of both sides of the display panel 101 according to an embodiment of the present disclosure.

In step S201, brightness values of the respective tie-point grayscale of the central region of the display panel 101 are acquired and the brightness values are recorded as L0, L16, L31, L127 and so on. In step S202, the image is switched to a grayscale image that need to be adjusted and the respective tie-point grayscale of the regions of both sides are adjusted, through the computation module 106, so that the brightness values of the respective tie-point grayscale of the regions of both sides are respectively equal to the brightness values of the respective preset tie-point grayscale of the central region (for example, the target brightness values of grayscales such as 16 grayscale, 31 grayscale, 127 grayscale, 223 grayscale and so on), for example, when an image of 16 grayscale is adjusted, the grayscale is increased or decreased by taking the 16 grayscale as a start point of adjustment, until a brightness of the tie-point grayscale of the regions of both sides is consistent with a brightness of the tie-point grayscale of the central region. In step S203, grayscale data and brightness data of the respective regions are transmitted to the computation module for further processing.

Figure 7:
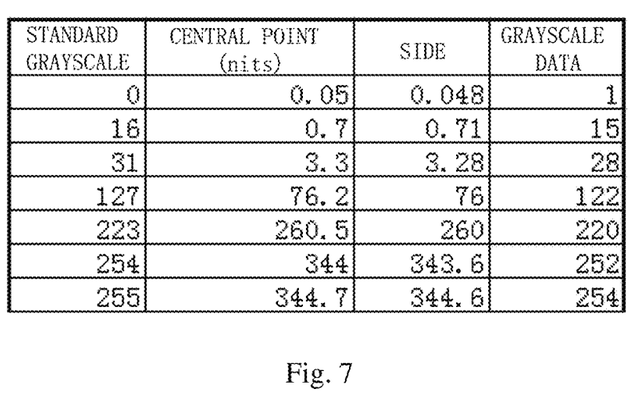
FIG. 7 is a group of exemplary grayscale and brightness data according to an embodiment of the present disclosure.

FIG. 7 shows a group of exemplary grayscale and brightness data according to an embodiment of the present disclosure. As shown in FIG. 7, values of standard grayscale are 0, 16, 31, 127, 223, 254, 255 and so on. When the standard grayscale is 16 grayscale, in a gamma correction solution according to an embodiment of the present disclosure, a brightness of a central point is 0.7 nits, a brightness of a side is 0.71 nits, and the corresponding grayscale value is 15. Thus, it can be seen that the grayscale and brightness of the central region and the regions of both sides of the display panel can be corrected in a better manner by using the gamma correction method of the present disclosure, thereby effectively improving the display effect of the entire display panel.

Figure 8:
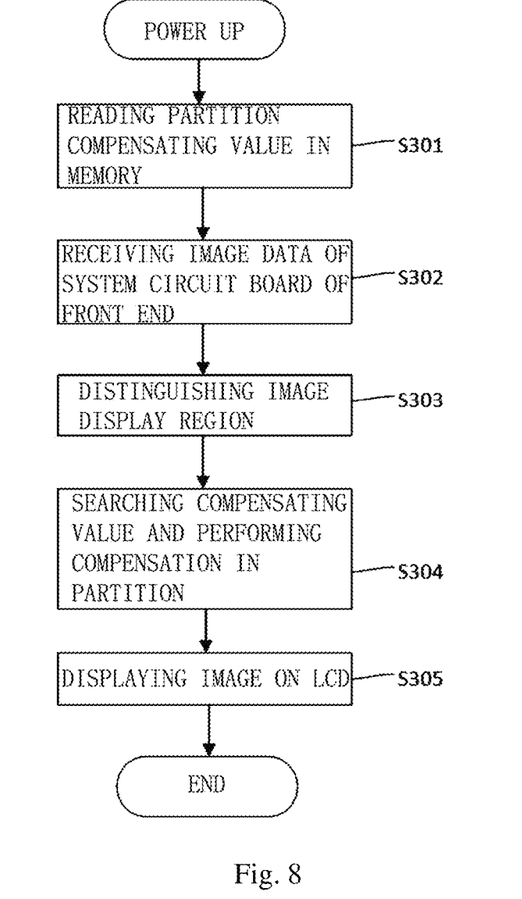
FIG. 8 is an operation flowchart of correcting a gamma curve of the display panel of the liquid crystal display according to an embodiment of the present disclosure.

FIG. 8 is an operation flowchart of correcting a gamma curve of the display panel according to an embodiment of the present disclosure.

First, a timing controller in the control module is powered up to start the operation. In step S301, the TCON reads the stored compensating grayscale values of the respective regions from the memory in the control module. In step S302, the TCON receive the original image data from a front end circuit board of the display system. In step S303, display regions of the image are distinguished based on the display panel and the image data. In step S304, the corresponding compensating grayscale value is searched based on the different display regions so as to perform correction or compensation respectively with respect to different regions. In step S305, the compensated or corrected image data is transmitted to the LCD, so as to display the corrected image on the display panel of the LCD. At this point, the above gamma correction process is over.

Figure 9:
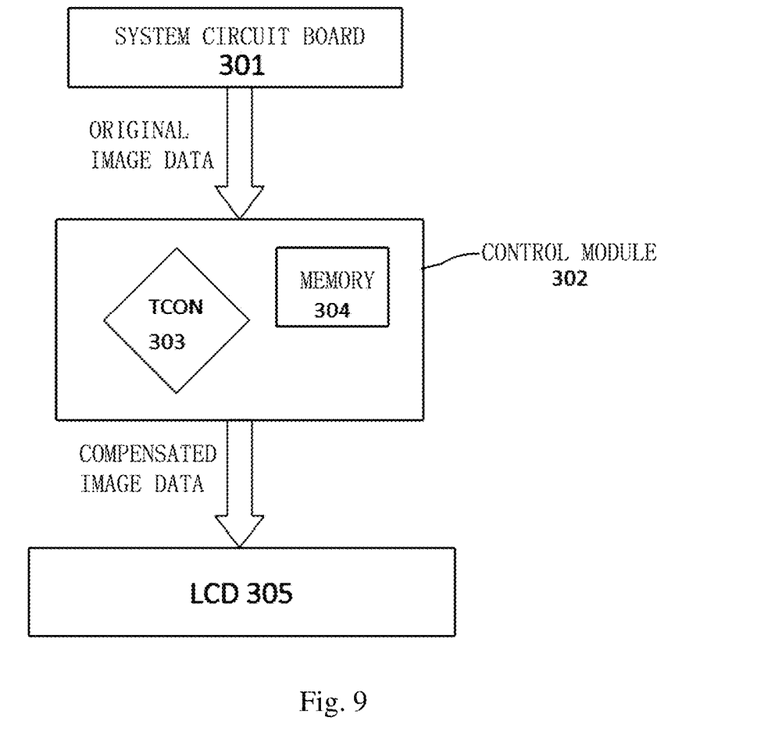
FIG. 9 shows an image data stream for image display according to an embodiment of the present disclosure.

FIG. 9 shows an image data stream for image display according to an embodiment of the present disclosure. The circuit board 301 of the display system transmits an original image data stream to the control module 302 in which a timing controller (TCON) 303 that may perform a gamma correction process and a memory 304 that may store data or information such as compensating grayscale value are provided. The control module 302 processes the original image data according to the above gamma correction operation in order to generate the compensated or the corrected image data. Then, the control module 302 transmits the compensated image data to the LCD 305, and the corrected image is displayed through a display panel of the LCD 305.

In the respective operation processes described with reference to the drawings, instead of performing processing according to the specific operation sequence as shown, some steps may be added or deleted according to the specific embodiments, or may be omitted.

By adopting the gamma correction system and method of the present disclosure, the grayscale compensation or correction can be performed with respect to different regions of the display panel. For example, the gamma curve on a horizontal region of the liquid crystal display panel can be optimized in order to improve the display quality of the liquid crystal display panel.

The above embodiments of the present disclosure are only exemplary embodiments, and the present disclosure is not limited to the above embodiments. Those skilled in the art may know that: the exemplary embodiments can be changed without deviating from the principle and idea of the present disclosure, wherein, the scope of the present disclosure is defined by the claims and the equivalents thereof.

The invention claimed is:

1. A gamma correction method used for a display panel of a liquid crystal display, comprising:
    measuring actual brightness values of preset highest grayscale and lowest grayscale of a central region of the display panel;
    computing target brightness values of respective preset tie-point grayscale of the central region based on the actual brightness values of the preset highest grayscale and lowest grayscale of the central region, wherein the respective preset tie-point grayscale are located between the preset highest grayscale and the lowest grayscale;
    adjusting the respective preset tie-point grayscale of the central region and regions of both sides respectively according to the target brightness values of the respective preset tie-point grayscale of the central region, and computing compensating grayscale values of the adjusted respective preset tie-point grayscale of the central region and the regions of both sides;
    storing the compensating grayscale values of the central region and the regions of both sides, and correcting the gamma curves of the central region and the regions of both sides by using the stored compensating grayscale values of the central region and the regions of both sides;
    wherein adjusting the respective preset tie-point grayscale of the central region and regions of both sides according to the target brightness values of the central region and computing the adjusted compensating grayscale values of the central region and the regions of both sides comprises:
    allowing the display panel to display images of the respective preset tie-point grayscale, and measuring the actual brightness values of the respective preset tie-point grayscale of the central region of the display panel;
    adjusting the respective preset tie-point grayscale of the central region according to the target brightness values of the respective preset tie-point grayscale of the central region, so that the actual brightness values of the respective preset tie-point grayscale are respectively equal to the target brightness values of the respective preset tie-point grayscale;
    computing the compensating grayscale values of the adjusted respective preset tie-point grayscale of the central region.

2. The gamma correction method of claim 1, wherein measuring the actual brightness values of the preset highest grayscale and lowest grayscale of the central region of the display panel further comprises:
    allowing the display panel to display images of the preset highest grayscale and lowest grayscale;
    measuring and recording respectively the actual brightness values of the preset highest grayscale and lowest grayscale of the central region of the display panel.

3. The gamma correction method of claim 1, wherein adjusting the respective preset tie-point grayscale of the central region and regions of both sides according to the target brightness values of the central region and computing the adjusted compensating grayscale values of the central region and the regions of both sides further comprises:
    measuring the actual brightness values of the respective preset tie-point grayscale of the regions of both sides of the display panel;
    adjusting the corresponding respective preset tie-point grayscale of the regions of both sides according to the brightness values of the adjusted respective preset tie-point grayscale of the central region, so that the actual brightness values of the respective preset tie-point grayscale of the regions of both sides are respectively equal to the target brightness values of the respective preset tie-point grayscale of the central region;
    computing the compensating grayscale values of the adjusted respective preset tie-point grayscale of the regions of both sides.

4. The gamma correction method of claim 1, wherein the respective preset tie-point grayscale of the central region and the regions of both sides are adjusted by adjusting the gamma voltage.

* * * * *